(12) United States Patent
Kuntz et al.

(10) Patent No.: US 8,702,884 B2
(45) Date of Patent: Apr. 22, 2014

(54) METHOD FOR PRE-FORMING A TEXTILE SEMI-FINISHED PRODUCT AND A PRE-FORMING APPARATUS

(75) Inventors: Julian Kuntz, Augsburg (DE); Franz Stadler, Boehmfeld (DE)

(73) Assignee: EADS Deutschland GmbH, Munich (DE)

( * ) Notice: Subject to any disclaimer, the term of this patent is extended or adjusted under 35 U.S.C. 154(b) by 136 days.

(21) Appl. No.: 13/320,455

(22) PCT Filed: May 12, 2010

(86) PCT No.: PCT/DE2010/000543
§ 371 (c)(1),
(2), (4) Date: Nov. 14, 2011

(87) PCT Pub. No.: WO2010/130253
PCT Pub. Date: Nov. 18, 2010

(65) Prior Publication Data
US 2012/0055627 A1    Mar. 8, 2012

(30) Foreign Application Priority Data
May 15, 2009   (DE) .................. 10 2009 021 591

(51) Int. Cl.
*B32B 37/00* (2006.01)
*D03D 47/50* (2006.01)

(52) U.S. Cl.
USPC ....... 156/88; 156/272.8; 156/275.1; 156/290; 156/322; 156/251; 156/268

(58) Field of Classification Search
USPC ........... 156/272.8, 275.1, 290, 322, 251, 268, 156/88; 264/510, 571
See application file for complete search history.

(56) References Cited

U.S. PATENT DOCUMENTS

| | | | |
|---|---|---|---|
| 3,654,019 A | 4/1972 | Cusick | |
| 4,029,535 A * | 6/1977 | Cannon et al. | 156/272.8 |

(Continued)

FOREIGN PATENT DOCUMENTS

| | | |
|---|---|---|
| DE | 35 41 954 C2 | 6/1986 |
| DE | 41 33 040 A1 | 4/1992 |

(Continued)

OTHER PUBLICATIONS

International Search Report with partial English translation dated Feb. 14, 2011 (four (4) pages).

(Continued)

*Primary Examiner* — Linda L. Gray
(74) *Attorney, Agent, or Firm* — Crowell & Moring LLP

(57) ABSTRACT

A method for preforming a textile semi-finished product, including arranging a textile having at least two layers of fibers, interwoven fibers and/or fiber bundles that are at least in part arranged on top of each other. The method also includes; fixing-in-position of the fibers of the textile against each other and then cutting-to-size of the textile. The fixing-in-position of the textile involves irradiating via a laser beam in order for the melt-on binder of the textile to be melted on only in a localized fashion and not evaporated. The fixing-in-position occurs along a fix-in-position line, the cutting-to-size occurs along a cut-to-size line, and the fix-in-position line is located at a distance relative to the cut-to-size line that is so small that any fraying of the textile is reduced or suppressed altogether.

10 Claims, 1 Drawing Sheet

(56) References Cited

U.S. PATENT DOCUMENTS

Figure 1:
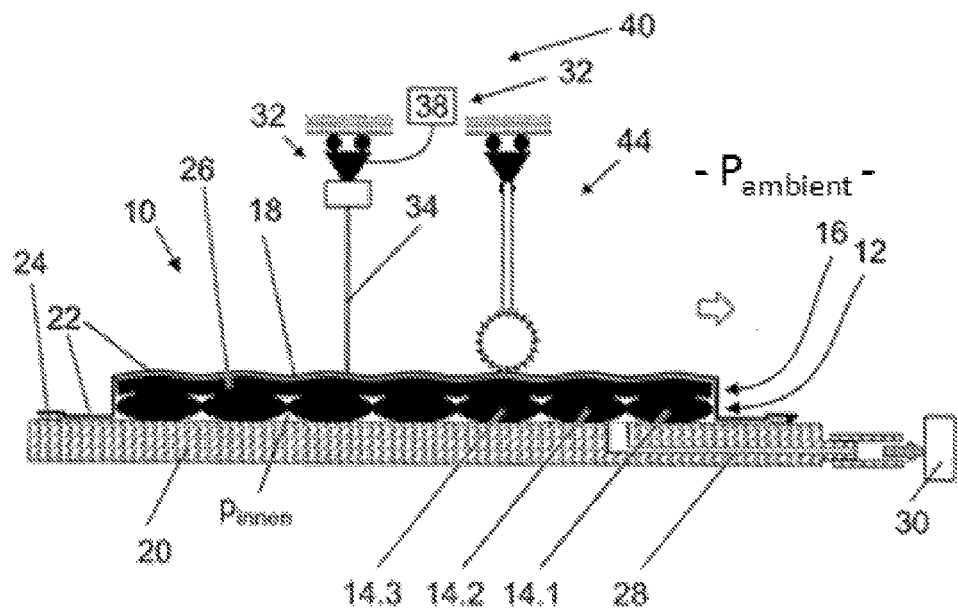

| | | | |
|---|---|---|---|
| 4,500,382 A * | 2/1985 | Foster | 156/272.8 |
| 4,683,018 A | 7/1987 | Sutcliffe et al. | |
| 5,200,592 A | 4/1993 | Yabu | |
| 5,418,035 A | 5/1995 | Iguchi et al. | |
| 5,981,034 A * | 11/1999 | Gray et al. | 428/193 |
| 6,343,639 B1 | 2/2002 | Kaye et al. | |
| 7,615,128 B2 * | 11/2009 | Mikkelsen | 156/88 |
| 2003/0186011 A1 * | 10/2003 | Sloot | 428/40.1 |
| 2006/0108060 A1 * | 5/2006 | Benjamin-Shaw | 156/256 |
| 2007/0131337 A1 * | 6/2007 | Guilhem et al. | 156/93 |
| 2009/0022940 A1 * | 1/2009 | Weber et al. | 428/113 |
| 2009/0061182 A1 * | 3/2009 | Chikama | 428/212 |
| 2013/0207316 A1 * | 8/2013 | Sekido et al. | 264/511 |

FOREIGN PATENT DOCUMENTS

| | | |
|---|---|---|
| DE | 43 33 877 A1 | 5/1994 |
| DE | 693 04 042 T2 | 12/1996 |
| DE | 199 52 443 A1 | 5/2001 |
| DE | 699 05 752 T2 | 10/2003 |
| DE | 10 2007 032 904 B3 | 11/2008 |
| EP | 0 620 091 A1 | 10/1994 |
| EP | 1 298 075 A1 | 4/2003 |

OTHER PUBLICATIONS

Form PCT/ISA/237 (six (6) pages).

* cited by examiner

METHOD FOR PRE-FORMING A TEXTILE SEMI-FINISHED PRODUCT AND A PRE-FORMING APPARATUS

BACKGROUND AND SUMMARY OF THE INVENTION

Exemplary embodiments of the present invention relate to a method for preforming a textile semi-finished product having the steps (a) arranging a textile, and wherein the textile comprises (i) at least two layers of fibers that are at least in part arranged on top of each other, and/or (ii) interwoven fibers and/or fiber bundles, on a substrate; (b) fixing-in-position of the fibers of the textile against each other; and (c) thereafter cutting-to-size of the textile, and wherein the fixing-in-position of the fibers of the textile comprises an irradiation step with a laser beam so that a melt-on binder of the textile is melted on in a localized fashion only and not evaporated.

According to a second aspect, exemplary embodiments of the present invention relates to a preforming apparatus for preforming a textile semi-finished product.

Preforming is a step in the manufacture of building components made of fibrous composite materials. After the cutting-to-size step, the cutting edges of the textile are normally no longer fixed in position. This causes the textile to become frayed easily; a dropped stitch in a seam causing a run can undo the seam holding the fabric together and may result in the textile losing its desired arrangement when it is incorporated as a semi-finished product in the manufactured component.

Therefore, it is known in the art to use a textile that comprises a melt-on binder. Before the textile is cut to size, it is heated in an oven resulting in the fusing of individual fibers of the textile. Subsequently, the textile is cut to size, and because the fibers are agglutinated, any fraying is prevented.

The thus obtained semi-finished product is quite rigid, which renders it difficult to fit it into a corresponding component mold for subsequent impregnation and curing.

German Patent Document DE 199 52 443 A1 discloses a method in which the different layers of the textile are sewn to each other in order to achieve the necessary slip-proofness that is necessary for the cutting process. This technique, however, still results in the textile tending to fray along its seams.

German Patent Document DE 693 04 042 T2 discloses a method and an apparatus for manufacturing structurally reinforced preforms. These preforms are interconnected at individual sites by melting-on a binder. Several layers are fastened to each other in this way, which provides better handling properties. But the method described therein can also lead to fraying.

German Patent Document DE 35 41 954 C2 discloses a method for the manufacture of composite bodies that can be used to produce composite bodies having sharp edges. To this end, the synthetic resin that is present in the textile is partially cured, while the individual fiber layers are separated from one another by thin, elastic separating film. These separating films are removed after the fact and the partially cured fiber layers are pressed into the finished composite body. The specification does not address the problem of fraying during cutting.

U.S. Pat. No. 5,418,035 A discloses a method for manufacturing a composite fiber component in which the individual layers of a textile are first fastened to each other at one edge in order to then insert the textile in the mold. This patent does not address the problem of fraying during cutting.

German Patent Document DE 10 2007 032 904 B3 discloses a method for the structural fixation of a textile two-dimensional construct that seeks to prevent any falling apart of the textile semi-finished product during the cutting-to-size step by simple means. Future load scenarios are simulated to this end, and the locations in the semi-finished product are identified in relation to the resulting finished component that will undergo only minimal displacement due to stresses. The textiles are connected with each other at these locations. The method is not configured to prevent fraying.

Exemplary embodiments of the present invention are directed to preventing frayed edged on textile semi-finished products.

Advantageously, exemplary embodiments of the present invention provide that the fibers of the textile are interconnected adjacent to the later cut-to-size line, meaning the later cut-to-size edge, thereby preventing fraying along the edges. It is also advantageous that this fixing in position will not lead to excessive stability and rigidity in the emerging preform. The resulting preform thus maintains its draping capacity and can also be adjusted to double-curved geometries. Moreover, it is possible to produce preforms that are small and of complex designs.

It is furthermore advantageous that no allowance is necessary along the edges as is required with prior art methods. In a strength calculation such edges cannot be considered as carrying, which leads to elevated component weights in the finished component.

Furthermore, it is advantageous that the fixing-in-position step can be implemented by a laser in an automated fashion. This is possible, in particular, because the laser beam can be guided over the textile without touching it. The area in which the fibers are interconnected is quite narrow so that the resulting preform remains unstable. For example, the laser beam is selected accordingly so that the fibers are interconnected across a width of less than one centimeter.

It is advantageous relative to inductive heating, for example, that the substrate upon which the textile is placed can be freely selected. No metal items may be nearby during inductive heating. If microwave radiation is used, it must be ensured that said radiation does not escape in the environment because this may cause injury to persons in the surrounding area.

Another advantageous aspect of the invention is that using the laser it is possible to achieve an even warm-up. Temperature measurements can be provided, for example, during the irradiation of the textile, such as by touch-less measuring. The laser's power, the diameter of the laser beam and/or the speed by which the laser advances can be adjusted accordingly so that a preset temperature will not be exceeded thus preventing damage to the textile. Moreover, it can be ensured that the temperature will not fall below a preset temperature place value thus guaranteeing secure interconnecting of the fibers inside the textile.

In the context of the present invention the fixing in position of the fibers of the textile is understood to mean that the fibers are interconnected at least locally in order to reduce the incidence of fraying during the subsequent cut-to-size step. It is preferred for the melt-on binder to be already present as part of the textile. But theoretically it would also be possible to apply the binder to the textile immediately before irradiation by the laser beam.

Cutting-apart is generally understood to mean, in particular, a separating action that can be achieved by the use of a mechanical tool; but it does not necessarily have to be a mechanical tool.

The binder is understood to mean, in particular, a melt-on material that is disposed in the vicinity of the fibers of the textile or that itself is present in the form of fibers. The binder can be incorporated in the textile or located on the textile. During the melt-on step the binder interconnects the fibers that are located in the surrounding area.

According to exemplary embodiments of the present invention, the fixing-in-position of at least two layers occurs along a fix-in-position line; while, in contrast, the cutting-to-size action occurs along the cut-to-size line. The fix-in-position line is arranged at a distance from the cut-to-size line that is selected in such a way as to reduce or suppress fraying of the textile altogether. For example, this distance may be between 0 mm and 5 mm. This causes the fraying that starts at the cut-to-size line to come to a halt at the latest when a dropped stitch, which had its origin at the cut-to-size line, reaches the fix-in-position line.

To fix the fibers in position, a preferred embodied example can provide that the layers are covered by a film that is transparent for laser light and the laser beam is irradiated through the film. The characteristic of the film being transparent for the light of the laser is understood to mean, in particular, that absorption and reflection together are less than 20%. By an adequate selection of the films it is possible to achieve transmission rates of above 90%. The higher the transmission rate, the lower are the losses and the fewer precautions must be taken to protect the environment against scattered laser light.

In particular, the film is transparent for laser radiation in such way that it does not melt on itself during the irradiation. Preferably, the film is selected at least in such a way that it comprises sufficiently pronounced separating surface properties, thus allowing the film to be removed again from the layers after the two layers have been fixed in position. Furthermore, preferably, the film is selected in such a way that the laser beam, if incident perpendicularly, is reflected at a maximum of 30% relative to its power.

The characteristic that the laser beam is incident in such a way that the melt-on binder of the textile is only melted on in a localized fashion and not evaporates is understood to mean, in particular, that an irradiation power and advancing speed of the laser are selected in such a way that a damage-causing temperature, which may lead to damage to the binder or the textile, is not exceeded at any location. In particular, the power density of the laser beam is selected in such a way that no significant charring occurs, meaning that there may be a certain amount of thermally induced damage to a portion of the binder and/or the fibers of the textile; however, the damage is so minimal that it does not have to be taken into account for the calculation of the strength of the component that is manufactured from the textile semi-finished product. In particular, the power density of the laser beam is selected in such a way that any thermally induced damage to the textile and/or the binder results only in a loss of strength that is less than 10%.

With regard to the fix-in-position and cut-to-size steps, it is preferred for the method to be automated. It is also conceivable to envision the step of arranging the at least two layers of the textile in an automated step.

According to one preferred embodied example, the textile is arranged on a substrate and air is suctioned out of the area between the substrate and the film prior to irradiation with the laser light. This causes the fibers to be fixed in position relative to each other and relative to the substrate. The lowered pressure furthermore lowers the risk of oxidation during heating. It is also possible to envision that the area between the film and the substrate is purged with an inert gas prior to the irradiation with the laser beam. It is beneficial for the residual pressure to be below 200 mbar, in particular less than 100 mbar.

Preferably, the textile is fixed in position before it is cut to size using a mechanical cutting device. Alternatively, the cutting-to-size action is achieved by a laser; specifically the same laser that is used for the fixing-in-position action. But this option can have the disadvantage that, during the cutting action, there may be thermally induced damage to the fibers and/or the binder resulting in a possible loss of strength of the completed component.

The steps of arranging, cutting-to-size and fixing-in-position can be repeated for several textile layers until a preformed semi-finished product comprising a plurality of textile layers has been manufactured. Moreover, before arranging a further textile layer on the already cut-to-size preform, it is possible to place a film thereon, evacuate the intermediate space, then connect the preform with the additional textile layer using a laser, and afterwards cut the additional textile layer to size. It is possible to implement the fix-in-position action first then cut apart. But it is also possible to implement both steps simultaneously, or cut apart first and then fix in position.

An apparatus that is suitable as a preform apparatus according to the invention for preforming a textile semi-finished product is designed and configured for the manufacture of a plurality of textile semi-finished products. In particular, the substrate, the cut-to-size device and the fix-in-position device are fastened to each other. Moreover, the cut-to-size device and the fix-in-position device are normally automated devices that are operated by a motor.

The substrate is understood to mean any device that is able to fix the layers of the fibers of the textile in position. The substrate can include a table, but an air-impermeable conveyor belt is also possible.

According to one preferred embodied example, the preform apparatus comprises a trigger unit that is designed to move the laser along the fibers of the textile, specifically in such a way that the fibers of the textile are fixed in position along the fix-in-position line; and for moving the cut-to-size device specifically in such a way that it cuts each layer apart along the cut-to-size line respectively, and wherein the fix-in-position line is located at a distance relative to the cut-to-size line that is so small that any fraying of the textile is reduced or suppressed altogether.

For example, the cut-to-size line can be arranged at a distance of less than 10 mm from the fix-in-position line. The trigger unit can be connected with input means and can use said means to establish the position of the cut-to-size line and/or the fix-in-position line in relation to the substrate. The trigger unit can, for example, have an interface that will allow reading in CAD data.

Preferably, the trigger unit is adjusted for moving the laser at a speed that is selected in relation to the intensity of the beam in such a way that the binder is only melted on, but not evaporated or charred, during irradiation with the laser beam. To this end, the trigger unit is connected with a temperature measuring device that measures the temperature at the location where the laser beam is located at a given instance.

The fix-in-position device preferably comprises a film placement device for placing a film and a differential pressure application device for applying a differential pressure causing the film to hug the two-dimensional textile. This film placement device can be automated, for example.

Preferably, the preform apparatus comprises a shielding device that is taken along in such a way that it absorbs any reflected parts of the laser beam. Thus, any hazard to persons in the area is avoided.

BRIEF DESCRIPTION OF THE DRAWING FIGURES

Figure 2:
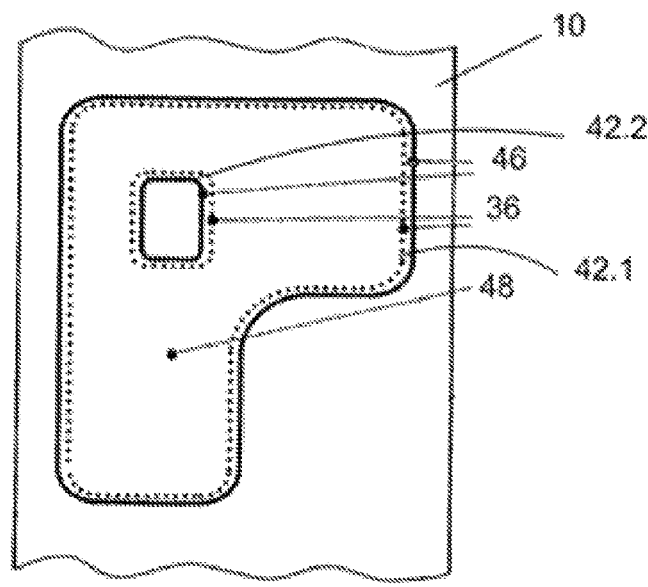

The invention will be explained in further detail using an exemplary embodiment in connection with the figures, which show:

FIG. 1 an apparatus according to the invention for implementing the method according to the invention; and FIG. 2 a schematic view of a textile semi-finished product with the associated fix-in-position and cut-to-size lines.

DETAILED DESCRIPTION

FIG. 1 shows a two-dimensional textile 10 in the form of a multi-axial contexture or fabric made of reinforcement fibers. The multi-axial contexture or fabric can comprise carbon fibers or consist of carbon fibers. The two-dimensional textile 10 that can also be designated a semi-finished product has a first layer 12 made up of a multitude of fiber bundles 14.1, 14.2, . . . that extend parallel relative to each other and preferably all comprise the same number of the carbon fibers, which are not visible in FIG. 1.

The two-dimensional textile 10 further comprises a second layer 16 of fiber bundles. Of the second layer of fiber bundles, only fiber bundle 18 is visible by way of a cross-section. The fiber bundles 14, on the one hand, and 18, on the other hand, enclose a fiber angle that is not shown here. The two-dimensional textile 10 is a semi-finished product that is infiltrated in a later processing step with a matrix material, such as, for example, a synthetic resin, in order to obtain a laminate. By curing in a mold, airplane parts are manufactured in this way. The invention therefore also relates to a method for manufacturing an airplane part or other structural components.

The two-dimensional textile 10 is located on a substrate 20 that is constituted by a, in as far as possible, smooth substrate board. A film 22 is placed on the top layer 16 in order to connect the first layer 12 with the second layer 16. The film is, for example, a polyethylene film having a thickness of, for example, 12 micrometers. The film 22 is pressed against the substrate 20 by the seal rails 24 or glued to the substrate by the sealing strips 24 thus resulting in a gas-proof connection. An intermediate space 26 is formed between the substrate 20 and the film 22, and the two-dimensional textile is arranged therein.

Using a device for applying a vacuum in form of a suction canal 28, the intermediate space 26 is connected with a vacuum pump 30 that continually suctions air from the intermediate space 26, thus resulting in a pressure difference of $\Delta p$ in excess of 800 millibar between an ambient pressure $p_{ambient}$ and an internal pressure $p_{internal}$. In particular, the ambient pressure is the atmospheric pressure of ca. 1013 millibar and the internal pressure is below 200 millibar, specifically below 100 millibar. In the present case, an internal pressure of $p_{internal}$=50 millibar is applied. But it is also possible to increase the ambient pressure $p_{ambient}$ by the placement of pressure bell housing.

Due to the application of the vacuum pressure to the intermediate space 26, the film 22 hugs the two-dimensional textile 10, compresses the latter in its thickness direction and thus fixes the two layers 12, 16 in position relative to each other. When the pre-adjusted internal pressure $p_{internal}$ is reached, a laser 32 moves along a pre-adjusted path, and whereby a laser beam 34 falls through the film 22 hitting the first layer 12 and the second layer 16. A binder, by which the respective fiber bundles 14 are impregnated, is thus melted on creating a fix-in-position line 36 (see FIG. 2). The course of the fix-in-position line 36 was preset by the trigger unit 38 that is in connection with the laser 32. The laser 32, suction canal 28, vacuum pump 30 and the trigger unit 38 are part of a fix-in-position device 40.

FIG. 2 represents a top view of the two-dimensional textile 10. It can be seen that the fix-in-position line 36 is arranged inside the two-dimensional textile 10. In the present example the fix-in-position line consists, furthermore, of two closed continuous lines, namely a first continuous line 42.1 and a second continuous line 42.2.

FIG. 1 also schematically depicts a cut-to-size device 44 for the chip-forming separation of a two-dimensional textile 10 along a cut-to-size line 46 (FIG. 2). The cut-to-size line 46 also consists of two continuous lines that are at a distance relative to the fix-in-position line 36 of one millimeter, for example.

In a subsequent work step the completed textile semi-finished product 48, which can also be referred to as a cut, can be removed. During the work steps that follow, the semi-finished product 48 is impregnated with resin, the resin is cured and thus a structural top part is manufactured.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SYMBOLS

10 Two-dimensional textile
12 First layer
14 Fiber bundle
16 Second layer
18 Fiber bundle
20 Substrate
22 Film
24 Seal rail
26 Intermediate space
28 Suction canal
30 Vacuum pump
32 Laser
34 Laser beam
36 Fix-in-position line
38 Trigger unit
40 Fix-in-position device
42 Continuous line
44 Cut-to-size device
46 Cut-to-size line
48 Semi-finished product

The invention claimed is:

1. A method for preforming a textile semi-finished product comprising the steps:
   arranging a textile, wherein the textile includes
      at least two layers of fibers arranged at least in part on top of each other; or interwoven fibers or fiber bundles;
   fixing-in-position of the fibers of the textile against each other, and then
   cutting-to-size of the textile, wherein
      the fixing-in-position of the fibers of the textile comprises irradiating with a laser beam in order for a melt-on binder of the textile to be melted only in a localized fashion but not evaporated, the fixing-in-position of the fibers of the textile occurs along a fix-in-position line and the cutting-to-size occurs along a cut-to-size line, and the fix-in-position line is located at such a small distance relative to the cut-to-size line that any fraying of the textile is reduced or suppressed altogether.

2. The method according to claim 1, further comprising the steps:

covering the layers with a film that is transparent for the light of the laser; and irradiating via the laser beam through the film.

3. The method according to claim 2, wherein the fixing-in-position of the fibers occurs before the cutting-to-size, and the cutting-to-size of the textile occurs using a mechanical cutting device.

4. The method according to claim 2, wherein a semi-finished product comprising a plurality of layers is manufactured by arranging another textile on the textile and repeating the steps of arranging, fixing-in-position, and cutting-to-size.

5. A method for preforming a textile semi-finished product comprising the steps:

a) arranging a textile on a substrate, wherein the textile includes a melt-on binder and (1) at least two layers of fibers arranged at least in part on top of each other or (2) interwoven fibers or fiber bundles;

b) covering the layers with a film that is transparent to laser light;

c) suctioning air from an area between the substrate and the film;

d) fixing-in-position of the fibers of the textile against each other by irradiating the textile with a laser beam having a power density to melt, but not evaporate, the melt-on binder of the textile in a localized fashion;

e) cutting-to-size of the textile;

f) removing the cut-to-size textile from the covering;

g) impregnating the textile semi-finished product after the fixing-in-position and cutting-to-size; and h) curing the impregnated semi-finished product in order to obtain a composite fiber component, wherein the fixing-in-position of the fibers of the textile occurs along a fix-in-position line and the cutting-to-size occurs along a cut-to-size line, wherein the fix-in-position line is located at such a small distance relative to the cut-to -size line that any fraying of the textile is reduced or suppressed altogether, and wherein steps a) - h) are performed in order.

6. The method according to claim 5, wherein the cutting-to-size of the textile occurs using a mechanical cutting device.

7. The method according to claim 5, wherein a semi-finished product comprising a plurality of layers is manufactured by arranging another textile on the textile and repeating the steps of arranging, fixing-in-position, and cutting-to-size.

8. A method for preforming a textile semi-finished product comprising the steps:

a) arranging a textile on a substrate, wherein the textile includes a melt-on binder and (1) at least two layers of fibers arranged at least in part on top of each other or (2) interwoven fibers or fiber bundles;

b) covering the layers with a film that is transparent to laser light;

c) suctioning air from an area between the substrate and the film;

d) fixing-in-position of the fibers of the textile against each other by irradiating the textile with a laser beam having a power density to melt, but not evaporate, the melt-on binder of the textile in a localized fashion;

e) cutting-to-size of the textile;

f) removing the cut-to-size textile from the covering;

wherein the fixing-in-position of the fibers of the textile occurs along a fix-in-position line and the cutting-to-size occurs along a cut-to-size line, wherein the fix-in-position line is located at such a small distance relative to the cut-to -size line that any fraying of the textile is reduced or suppressed altogether, and wherein steps a) - f) are performed in order.

9. The method according to claim 8, wherein the cutting-to-size of the textile occurs using a mechanical cutting device.

10. The method according to claim 8, wherein a semi-finished product comprising a plurality of layers is manufactured by arranging another textile on the textile and repeating the steps of arranging, fixing-in-position, and cutting-to-size.

* * * * *